United States Patent [19]

Ikedo et al.

[11] Patent Number: 5,734,631
[45] Date of Patent: Mar. 31, 1998

[54] DISC PLAYER AND METHOD OF REPRODUCING THE SAME

[75] Inventors: Yuji Ikedo; Yoshifumi Masunaga, both of Tokorozawa; Kanya Matsumoto, Meguro, all of Japan

[73] Assignee: Pioneer Electronic Corporation, Tokyo, Japan

[21] Appl. No.: 543,083

[22] Filed: Oct. 13, 1995

[30] Foreign Application Priority Data

Oct. 18, 1994 [JP] Japan .................. 6-252546

[51] Int. Cl.⁶ ............................................. G11B 7/12
[52] U.S. Cl. .................... 369/44.14; 369/47; 369/32
[58] Field of Search ................. 369/32, 47, 48, 369/49, 50, 54, 58, 59, 124, 44.14, 44.28, 44.29, 44.37, 13

[56] References Cited

U.S. PATENT DOCUMENTS 5,161,142 11/1992 Okano .............................. 369/58 X
5,270,879 12/1993 Shima et al. ..................... 369/58 X

*Primary Examiner*—Muhammad N. Edun
*Attorney, Agent, or Firm*—Morgan, Lewis and Bockius LLP

[57] ABSTRACT

A disc player includes: a plurality of guide devices arranged radiately in radial directions of a disc from a rotary axis of the disc. Each of the guide devices includes two parallel shafts vertically arranged for supporting at least one pickup device in a manner slidable in the radial direction. The vertical positions of the parallel shafts of one of the guide devices are different from the vertical positions of the parallel shafts of the guide device neighboring to the one guide device so that the parallel shafts substantially vertically aligned at inner end portions of the shafts on the side of the rotary axis.

12 Claims, 15 Drawing Sheets

F I G. 3A
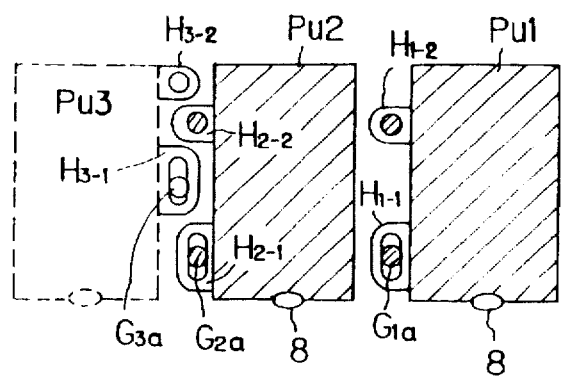
F I G. 3B
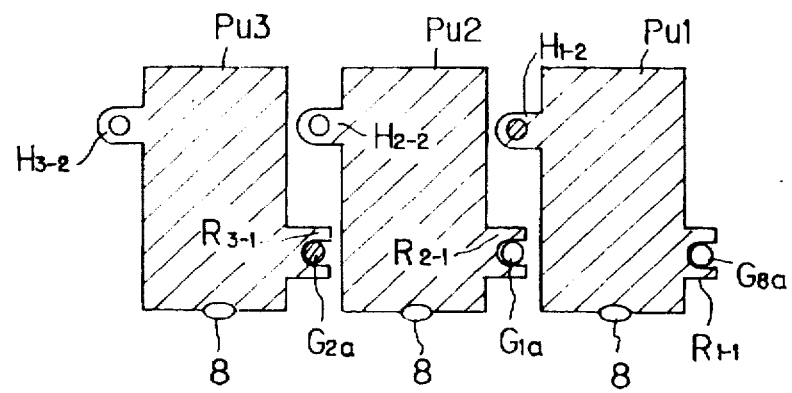

F I G. 4
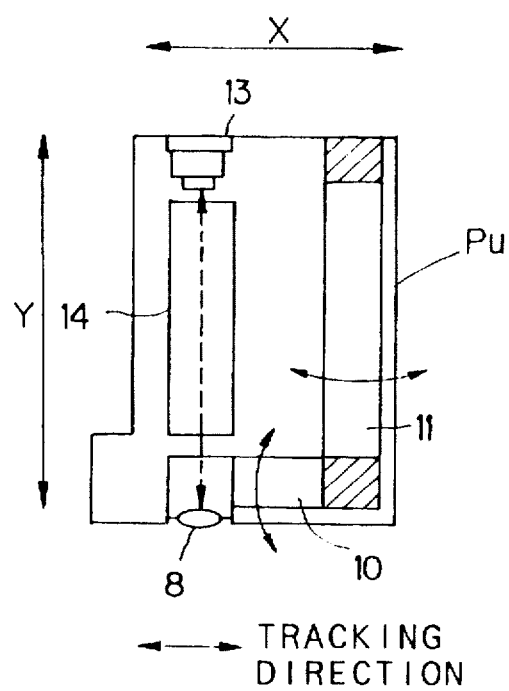

F I G. 5
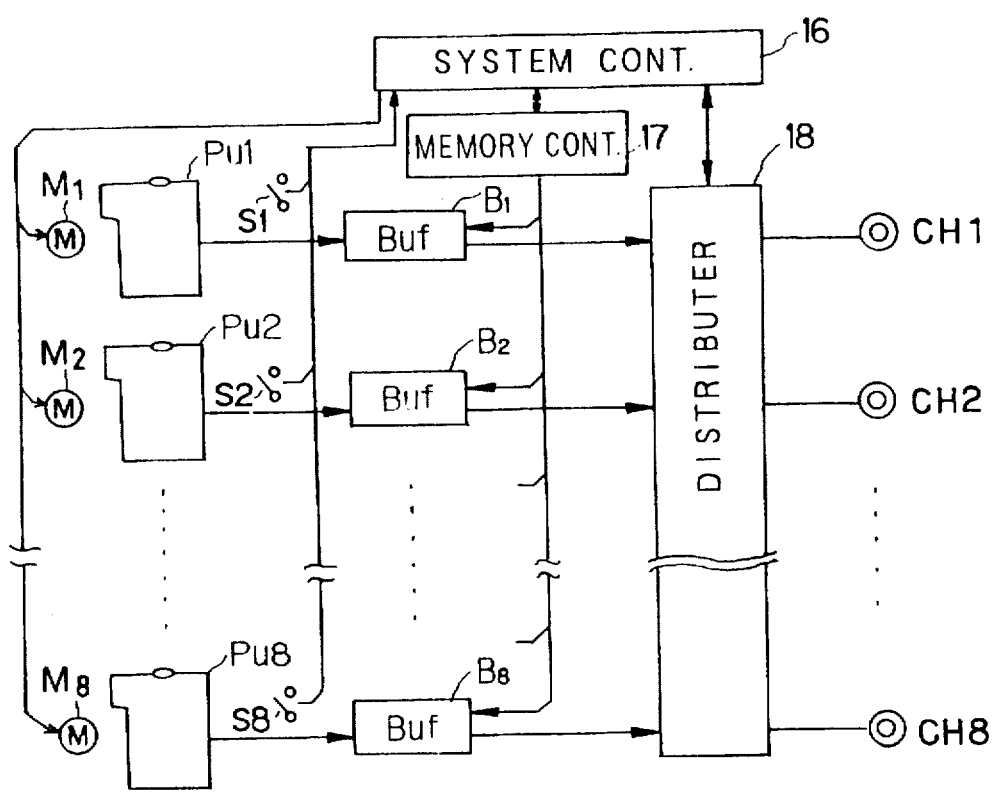

F I G. 8
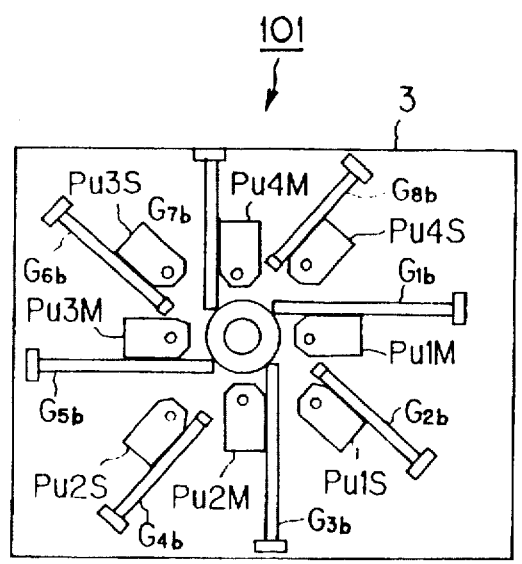

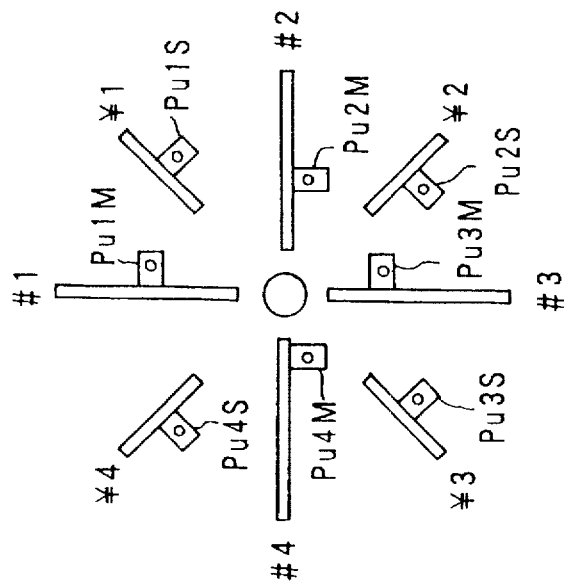
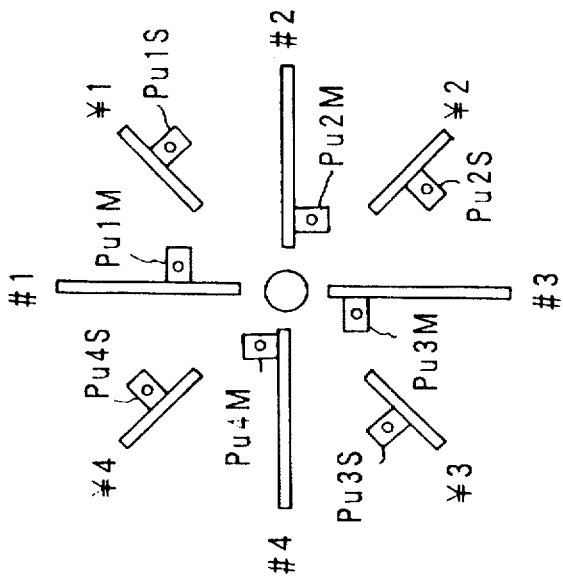

1

DISC PLAYER AND METHOD OF REPRODUCING THE SAME

BACKGROUND OF THE INVENTION

1. Field of the Invention

This invention relates to a system for a video program service, so-called Video On Demand (VOD) system, which supplies video programs to user's who request the programs utilizing a CATV system or the like, and more particularly to a technique for reproducing the same video program from a unique video disc at different times with predetermined time lags.

2. Description of the Prior Art

There is known a disc reproduction device having an ability to reproduce video signals from a unique video disc at different times (hereinafter referred to as "VOD reproduction"). One of the devices of this type has a structure as shown in FIG. 1A. As shown, the disc reproduction device 103 includes four guide bars 35–38 arranged to extend in four radial directions normal to each other from the rotary axis 34 of the disc, and four pickups 30–33 attached to the guide bars 35–38, respectively. The guide bars 35–38 are arranged with equal rotational angles therebetween in the circumferential direction of the disc. The device 103 enables four simultaneous playback of the same video program from a unique disc with a predetermined time lags, by means of a single disc rotation mechanism. Namely, the four pickups 30–33 reproduce the same program from the innermost circumference of the disc with the predetermined time lags (e.g., 15 minutes), respectively. Since the four pickups 30–33 are operable independently of each other, it is equivalent to the case where four independent reproduction systems exist. FIG. 1B shows a time-chart illustrating the case in which a user requests the program playback using the device 103. It is assumed that four pickups reproduce the same program with the time lag of 30 minutes therebetween. Where the user requests the playback of the program at 12:35, the playback responsive to the request begins at 13:00 which is the next playback start time. It is preferable in the VOD reproduction that the video programs periodically start with approximately equal time lags (time intervals) between them. The interval of the playback start times is under the following limitation:

Time interval=(total playback time of the program)/(the number of the pickup devices)

Since the user generally wishes to watch the video program from the start, he or she needs to wait for the start of the next program. Shortening the time interval of the programs contributes to the reduction of the user's waiting time. In this view, in order to reduce the user's waiting time, it is required to equip the VOD reproduction device with as many pickup devices as possible.

However, in the above described VOD reproduction device, the physical shape and the structure of the pickup itself put the limitation on the number of pickup device to be equipped, and therefore it is difficult to reduce the time interval of the programs beyond a certain extent. Specifically, the known reproduction device is provided with the guide mechanism of the pickup (e.g., guide bar) at both sides of the pickup to ensure the smooth transfer of the pickup in the radial direction of the disc. Therefore, if the guide bars are arranged closely to each other so as to increase the number of the pickup device, they contact and interfere with each other in the proximity of the rotary axis of the disc due to their structural features (this phenomenon is hereinafter referred to as "interference").

SUMMARY OF THE INVENTION

It is an object of the present invention to provide a disc player provided with a plurality of pickup devices so as to reduce the program waiting time of the user in VOD reproduction.

It is another object of the present invention to provide a method of reproducing programs using the above disc player to reduce the program waiting time of the user.

According to one aspect of the present invention, there is provided a disc player including: a plurality of guide devices arranged radiately in radial directions of a disc from a rotary axis of the disc, each of the guide devices including two parallel shafts vertically arranged for supporting at least one pickup device in a manner slidable in the radial direction, vertical positions of the parallel shafts of one of the guide devices being different from the vertical positions of the parallel shafts of the guide device neighboring to the one guide device so that the parallel shafts are substantially vertically aligned at inner end portions of the shafts on the side of the rotary axis.

In accordance with the disc player thus constructed, the end portions of the parallel shafts of the two neighboring guide device align in the vertically direction. Therefore, the end portions of the guide devices do not contact or interfere with each other if a plurality of guide devices are provided, thereby increasing the number of the pickup devices provided on a disc player.

According to another aspect of the present invention, there is provided a disc player including: a plurality of pickup devices; and a plurality of guide devices arranged radiately in radial directions of a disc from a rotary axis of the disc, each of the guide devices including a plurality of shafts provided at one vertical wall surface of the pickup device for supporting the pickup device in a manner slidable in the radial direction.

In accordance with a disc player thus constructed, the shafts of the guide device movably support the pickup device at only one wall surface thereof. Therefore, the space for the pickup devices can be saved, and the guide devices or the pickup devices do not contact or interfere with each other if a plurality of guide devices are provided. As a result, many pickup device may be employed and the waiting time of the user in VOD reproduction may be reduced.

According to still another aspect of the present invention, there is provided a method of reproducing a program recorded on a disc for a plurality of times using a plurality of pickup devices, the method including the steps of: (a) selecting one of the pickup devices; (b) detecting whether two pickup devices neighboring to the pickup device selected in step (a) are located inside of a circular area having a predetermined radius from a rotary axis of the disc; (c) checking whether the neighboring pickup devices are reading the disc or not; (d) if both of the neighboring pickup devices are located outside of the circular area, then transferring the selected pickup device to a playback start position of the program at an inner circumferential area of the disc and starting a playback of the program; (e) if both of the neighboring pickup devices are located in the circular area and are not reading the disc, then transferring the neighboring pickup devices to outside of the circular area and transferring the selected pickup device to the playback start position to start the playback of the program; and (f) if at least one of the neighboring pickup devices are located in the circular area and are reading the disc, then selecting another pickup device and repeating the steps (b) to (f).

In accordance with the above method, if both of the neighboring pickup devices are located in the circular area and are not reading the disc, then the neighboring pickup devices are transferred to outside of the circular area and the selected pickup device is transferred to the playback start position to start the playback of the program. On the other hand, if at least one of the neighboring pickup devices are located in the circular area and are reading the disc, another pickup device is selected. Therefore, the interference between the neighboring pickup devices may be avoided where the size of the pickup devices is relatively large. In this view, many pickup devices can be employed and hence the waiting time of the user may be reduced.

According to still another aspect of the present invention, there is provided a disc player including: a plurality of pickup devices; a plurality of transfer device arranged radiately in radial directions of a disc from a rotary axis of the disc for transferring the pickup devices in the radial directions; a plurality of position detection devices for detecting the position of the pickup device in the radial direction and for outputting a first detection signal when the pickup device is transferred to an inner circumferential area of a circular area having a predetermined radius from a rotary axis of the disc; a check device for checking whether the pickup devices are reading the disc or not, and for outputting a second detection signal when each of the pickup devices are reading the disc; and a control device for receiving the first detection signals and second detection signals, for allowing the transfer devices to transfer the pickup devices neighboring to one pickup device to an outer area of the circular area, before starting a playback using the one pickup device, if the both of the neighboring pickup devices are located in the circular area and are not reading the disc, and for inhibiting the playback using the one pickup device if at least one the neighboring pickup devices are located in the circular area and are reading the disc.

In accordance with the disc player thus constructed, before starting a playback using the one pickup device, the control device allows the transfer devices to transfer the pickup devices neighboring to one pickup device to an outer area of the circular area, if the both of the neighboring pickup devices are located in the circular area and are not reading the disc. On the other hand, if at least one the neighboring pickup devices are located in the circular area and are reading the disc, the control device inhibits the playback using the one pickup device. Therefore, the interference between the neighboring pickup devices may be avoided where the size of the pickup devices is relatively large. In this view, many pickup devices can be employed and hence the waiting time of the user may be reduced.

According to still another aspect of the present invention, there is provided a method of reproducing a program recorded on a disc for a plurality of times with time intervals using a plurality of pickup devices, the method including the steps of: (a) determining the time interval based on a playback time of a program recorded on the disc; (b) transferring all of the pickup devices to an outside of a circular area having a predetermined radius from a rotary axis of the disc; (c) selecting one of the pickup devices and starting playback of the program using the selected pickup device; (d) selecting another one of the pickup devices other than two pickup devices neighboring to the one pickup device selected in the step (c) and starting playback of the program using the pickup device newly selected with a delay of the time interval from the playback in step (c); (e) selecting one of the pickup devices other than two pickup devices neighboring to the one pickup device selected in the step (d) and starting playback of the program using the pickup device newly selected with a delay of the time interval from a start of the playback in step (d); and (f) repeating the step (e).

In accordance with the above method, during the playback by one pickup device, another pickup device other than two pickup devices neighboring to the pickup device is selected, and the playback of the program is started using the pickup device newly selected with a delay of the time interval from the playback. As a result, the interference of the pickup devices may be avoided and hence the waiting time of the user may be reduced.

According to still another aspect of the present invention, there is provided a method of reproducing a program recorded on a disc for a plurality of times with time intervals using a plurality of pickup devices arranged radiately from a rotary axis of the disc in a manner movable in radial directions the disc, the method including the steps of: (a) determining the time interval based on a playback time of a program recorded on the disc; (b) transferring all of the pickup device to an outside of a circular area having a predetermined radius from the rotary axis; and (c) determining an order of the pickup devices used for playback, the determining step (c) including the steps of: (d) numbering all of the pickup devices in one of clockwise and counterclockwise direction; (e) selecting the odd-numbered pickup devices and starting playback using the odd-numbered pickup devices in an order from the one having a smallest number to the one having a largest number; and (f) selecting the even-numbered pickup devices and starting playback using the even-numbered pickup devices in an order from the one having a smallest number to the one having a largest number.

In accordance with the above method, the odd-numbered pickup devices start playback in the order from the one having a smallest number to the one having a largest number, and then the even-numbered pickup device start playback in the order from the one having a smallest number to the one having a largest number. As a result, the interference of the pickup devices may be avoided and hence the waiting time of the user may be reduced.

According to still another aspect of the present invention, there is provided a method of reproducing a program from a disc using a disc player including a plurality of pickup devices arranged radiately from a rotary axis of the disc in a manner movable in radial directions the disc, the pickup devices including at least one pair of an inside pickup device for reading at least an inside of a circular area having a predetermined radius from the rotary axis and an outside pickup device for reading an outside of the circular area, the method including the steps of: (a) starting a reproduction by the outside pickup device when the inside pickup device has read the disc up to an outer circumference of the circular area; (b) synchronizing a reproduction signal of the outside pickup device with a reproduction signal of the inside pickup device; and (c) changing an output signal of the disc player from the reproduction signal of the inside pickup device to the reproduction signal of the outside pickup device.

In accordance with the above method, the recorded area of the disc is divided into two areas, i.e., an inner circumferential area and an outer circumferential area, and playback operation of the inside pickup device is handed over to the outside pickup device. Therefore, the efficiency of the playback may be improved and the waiting time of the user may be reduced.

According to still another aspect of the present invention, there is provided a disc player including: a plurality of pickup devices arranged radiately from a rotary axis of a disc in a manner movable in radial directions of the disc, the pickup devices including at least one pair of an inside pickup device for reading at least an inside of a circular area having a predetermined radius from the rotary axis and an outside pickup device for reading an outside of the circular area; transfer devices for transferring the pickup devices in the radial directions independently of each other; detection devices for outputting a detection signal when the inside pickup device reproduces the disc up to an outer circumference of the circular area; a control device for permitting the outside pickup device to start reproduction in response to the detection signal; a synchronization device for synchronizing a reproduction signal of the outside pickup device with a reproduction signal of the inside pickup device; and an output selection device for changing an output signal of the disc player from the reproduction signal of the inside pickup device to the reproduction signal of the outside pickup device after the reproduction signals are synchronized by the synchronization device.

In accordance with the disc player thus constructed, the recording area of the disc is divided into two areas, i.e., an inner circumferential area and an outer circumferential area, and playback operation of the inside pickup device is handed over to the outside pickup device. Therefore, the efficiency of the playback may be improved. Additionally, since it is unnecessary that all pickup device are arranged to read the innermost circumferential area of the disc, the interference of the guide devices or pickup devices may be avoided, thereby reducing the waiting time of the user.

According to still another aspect of the present invention, there is provided a method of reproducing a program from a disc using a disc player including a plurality of pickup devices arranged in a manner slidable in the radial direction of the disc, the method including the steps of: (a) determining a group of the pickup devices for reproducing a program in combination; (b) determining a reproduction start position and a reproduction end position for each of the pickup devices belonging to the group; (c) starting reproduction of the program using one pickup device provided at an innermost circumferential position; (d) starting reproduction of the program using another one of the pickup devices provided immediately outside of the one pickup device; (e) synchronizing reproduction signals of the one pickup device and the another pickup device; and (f) changing an output signal from the reproduction signal of the one pickup device to the reproduction signal of the another pickup device.

In accordance with the above method, plural pickup devices are used and the playback of a program is successively handed over between the plural pickup devices. Namely, a program is reproduced by the plural pickup devices in combination. Therefore, efficiency of the playback may be improved and the smooth VOD reproduction may be achieved, thereby reducing the waiting time of the user.

According to still another aspect of the present invention, there is provided a disc player including: a plurality of pickup devices; a plurality of transfer device arranged radiately from a rotary axis of a disc for transferring a plurality of pickup devices independently of each other in radial directions of the disc; a control device for determining one of the pickup devices to which a reproduction of another pickup device is to be handed over and for starting reproduction by the one pickup device; a synchronization device for synchronizing a reproduction signal of the one pickup devices with a reproduction signal of the another one pickup device; and a change device for changing an output signal of the disc player from the reproduction signal of the another pickup device to the reproduction signal of the one pickup device.

In accordance with the disc player thus constructed, plural pickup devices are provided on the single transfer device to successively hand over the playback of a program. Namely, a program is reproduced by the plural pickup devices in combination. Therefore, efficiency of the playback may be improved, and the smooth VOD reproduction may be achieved, thereby reducing the waiting time of the user.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 3A and 3B are explanatory diagrams illustrating the arrangements of the pickup devices;

FIG. 4 is a diagram illustrating the structure of the pickup device according to the present invention;

FIG. 5 is a block diagram illustrating the control system of the disc player according to the first embodiment;

FIG. 8 is a plan view illustrating the structure of the disc player according to the second embodiment;

FIGS. 11A and 11B are diagrams schematically showing the movement of the pickup devices according to the second embodiment;

DESCRIPTION OF THE PREFERRED EMBODIMENT

Preferred embodiments of the present invention will be described below with reference to the accompanying drawings.

1st Embodiment

Figure 1A:
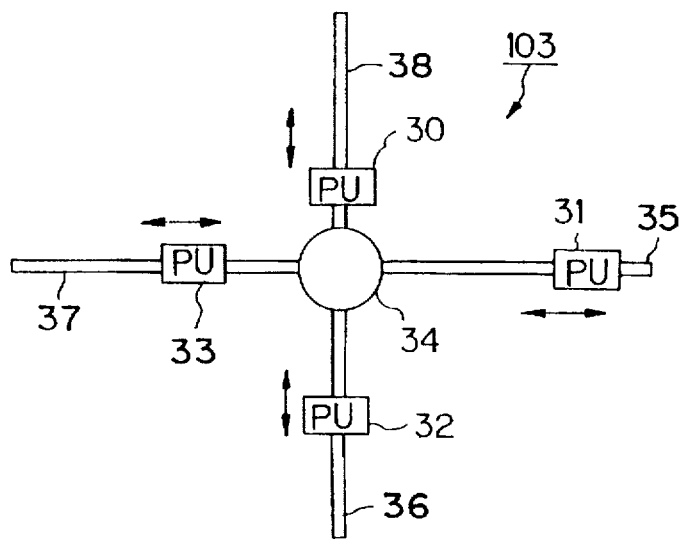
FIG. 1A is a plan view illustrating the construction of a known disc player.
Figure 1B:
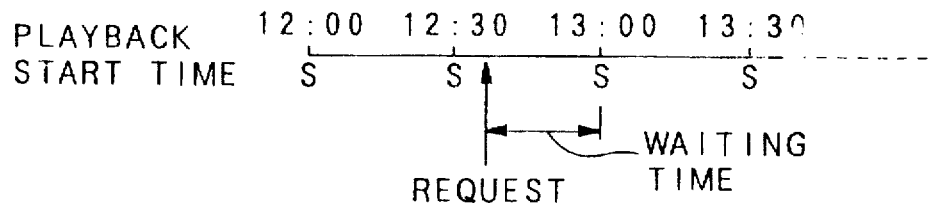
FIG. 1B is a time-chart illustrating the manner of the VOD reproduction.
Figure 2A:
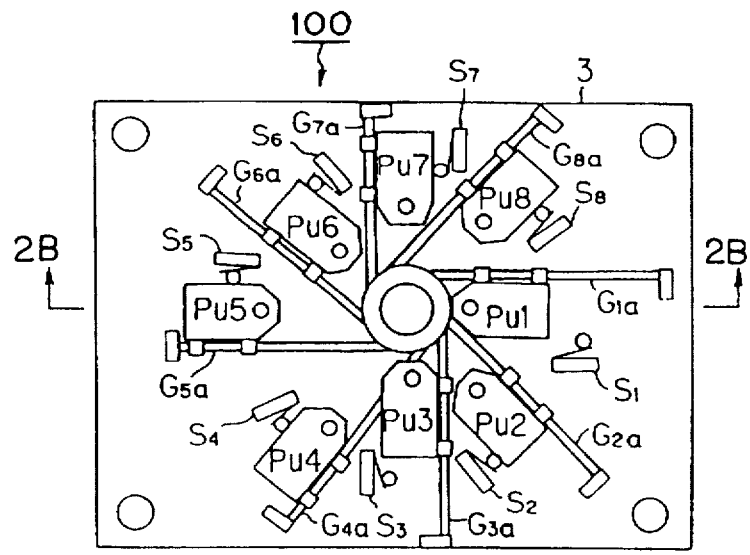
FIG. 2A is a plan view illustrating the structure of a disc player according to the first embodiment.
Figure 2B:
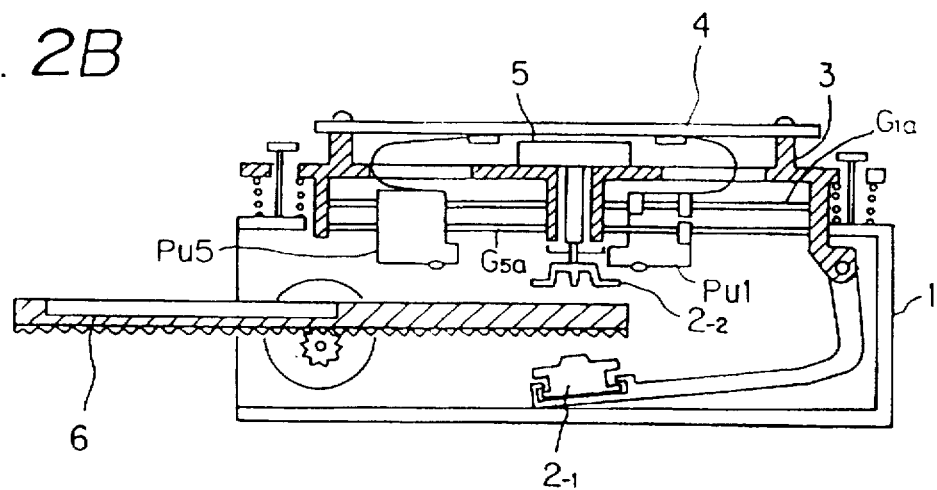
FIG. 2B is a cross-sectional view sliced at the line 2B—2B shown in FIG. 2A.

FIGS. 2A and 2B schematically illustrate the structure of the disc player 100 according to the first embodiment. FIG.

2A is a plan view illustrating the positioning manner of the pickup devices on the casing, and FIG. 2B is a cross-sectional view sliced at the line 2B—2B shown in FIG. 2A. As shown, the disc player 100 includes the casing 1, the clampets $2_{-1}$ and $2_{-2}$ for clamping the disc inserted thereto from both upper and lower sides, the pickup devices Pu1–Pu8, the base 3 for supporting the pickup devices Pu1–Pu8, the guide bars $G_{1a}$ to $G_{8a}$ to which the pickup devices Pu1–Pu8 are attached, the switches $S_1$–$S_8$ for detecting the positions of the pickup devices Pu1–Pu8 in the radial direction of the disc, the circuit board 4 on which a control circuitry is arranged, the spindle motor 5 for rotating the disc inserted, and the tray 6 slidable for insertion and ejection of the disc. The pickup devices are arranged as shown in FIG. 2B. Namely, the guide bars $G_{1a}$–$G_{8a}$ are disposed on the base 3 radially from the rotary axis of the disc, and the pickup devices Pu1–Pu8 are supported by the guide bars $G_{1a}$–$G_{8a}$ in a manner slidable in the radial direction of the disc. The switches $S_1$–$S_8$ output a detection signal, respectively, when the pickup device is transferred to the inner area of the predetermined position in the radial direction of the disc.

FIGS. 3A and 3B illustrate the preferable positional arrangements of the pickup devices. FIG. 3A shows a first arrangement and FIG. 3B shows a second arrangement. As shown in FIG. 3A, each of the pickup devices are formed with two pairs of guide holes (e.g., $H_{1-1}$ and $H_{1-2}$, $H_{2-1}$ and $H_{2-2}$) at one vertical wall surface thereof so that the guide bars pierce through them to support the pickup device. The upper guide holes (e.g., $H_{1-2}$ and $H_{2-2}$) are circular holes for fitting to and holding the guide bars substantially with no play in the vertical direction. On the contrary, the lower guide holes $H_{1-2}$ and $H_{2-2}$ are vertically elongated holes for holding the guide bars in a manner movable in the vertical direction, so as to absorb the unintentional mechanical movement or displacement and to enable smooth transfer of the pickup device along the guide bar without friction. By providing couples of holes vertically to receive guide bars, respectively, the pickup device can slide stably even when the pickup device is supported by the guide at only one vertical side thereof. According to the first arrangement described above, since the mechanism for holding the guide bar is provided at only one vertical side of the pickup device, the pickup devices can slide without physical interferes with each other even at the inner circumferential area of the disc. As an application, the pickup device may be so designed that the holes formed at the vertical wall surfaces oppose to each other, like the manner of the pickup devices Pu2 and Pu3 in FIG. 3A.

FIG. 3B shows the second arrangement of the pickup devices. As shown, the pickup device is formed with a couple of guide holes $H_{1-2}$, $H_{2-2}$ or $H_{3-2}$ at one vertical wall surface thereof for holding the guide bar therein, and a couple of guide recesses $R_{1-1}$, $R_{2-1}$ or $R_{3-1}$ formed on the other vertical wall surface of the pickup device for receiving the guide bar therein in a slidable manner. According to the second arrangement, since the pickup device needs the space for only one guide bar on both side thereof, the space around the pickup devices may be efficiently saved.

Next, the structure of the pickup device according to the present invention will be described. FIG. 4 illustrates the structure of the pickup device according to the present invention. As shown, the pickup device Pu includes the lens 8, the focus suspension 10 for holding the lens 8 and for finely adjusting the distance between the lens 8 and the light emission/reception element 13, the tracking suspension 11 for adjusting the position of the lens 8 with respect to the tracks of the disc in the radial direction of thereof, the light emission/reception element 13 for emitting the laser light and receiving the laser light reflected by the disc surface to convert it into a reproduction signal, and the optical system 14 for guiding the laser light between the light emission/reception element 13 and the lens 8. As seen from FIG. 4, the pickup device Pu is of vertically-elongated rectangular shape, i.e., so constructed that the height Y along the optical axis of the laser light is longer than the width X in the direction of the tracking control. Therefore, plural pickup devices may be positioned relatively densely within a small circular area like the innermost circumferential portion of the disc without interference therebetween.

FIG. 5 illustrates the control system of the disc player 100 according to the first embodiment. The control system shown in FIG. 5 is arranged on the circuitry board 4 in an integrated manner, and includes the buffers $B_1$–$B_8$, the system controller 16, the memory controller 17, the distributer 18 and the motors $M_1$–$M_8$. The buffers $B_1$–$B_8$ temporarily store the reproduction signals (e.g., RF signals) from the pickup devices Pu1–Pu8, and the memory controller 17 controls the writing of the reproduction signals into the buffers $B_1$–$B_8$. The buffers $B_1$–$B_8$ are mainly used for the synchronization adjustment of the reproduction signals outputted by the pickup devices Pu1–Pu8. The distributer 18 selects one of the reproduction signals supplied from the buffers $B_1$–$B_8$ and outputs it from any arbitrary one of the channels CH1–CH8. The system controller 16 controls the memory controller 17 and the distributer 18 based on the detection signals outputted by the switches $S_1$–$S_8$, and the motors $M_1$–$M_8$ drive the pickup devices Pu1–Pu8, respectively, under the control of the system controller 16.

Next, the operation of the disc player according to the first embodiment will be described with reference to FIGS. 6 and 7A–7C. It is noted that the following operation is carried out by or under the control of the system controller 16. First, as the initial operation, all pickup devices Pu1–Pu8 are transferred to the outside of the interference area $A_I$ (hatched portion in FIG. 7A) where neighboring pickup devices physically contact or interfere with each other if they move further toward the disc center, and then placed under the waiting condition. It is noted that the interference area can be determined in advance in accordance with the size of the guide bars, pickup devices and the arrangement of them. In this embodiment, the interference area may be a circular area having a predetermined radius from the rotary axis of the disc. Then, the operation starts from step S1 to wait for the arrival of the playback start time of the VOD reproduction. The playback start time is determined dependently upon the total playback time of the program on the disc and the number of the pickup devices employed. For example, where the program of two-hours total playback time is played by the disc player of this embodiment equipped with eight pickup devices, the playback of the program starts every fifteen minutes (i.e., 2 hours/8 pickup devices). The total playback time of the program may be checked by reading the index information of the disc after the insertion of the disc and before the start of the playback. When the playback start time arrives (step S1:YES), the first pickup device is selected (step S2). For example, the one having the smallest number, i.e., Pu1 is selected first. Then, it is checked whether the selected pickup device is currently in reproduction or not (step S3). If YES, the next pickup device (e.g., Pu2) is selected (step S7), and its state is checked (step S3). If the selected pickup device is not used for reproduction at that time but in the waiting state (step S3:NO), it is detected whether the neighboring pickup devices exist within the interference area $A_I$ or not, based on the detection signal from the switches provided on the guide bars on the both sides of the selected pickup device (step S4). If the neighboring pickup devices exist within the interference area $A_I$ (step S4:YES), it is checked whether at least one of the neighboring pickup devices are in reproduction or not (step S5). If not (step S5:NO), the non-used pickup devices are transferred to the outside of the interference area $A_I$ (step S6). For example, if the pickup device Pu1 is selected in step S2, the neighboring pickup devices Pu8 and Pu2 are examined in steps S3 and S4. If they are located within the interference area $A_I$ but not currently used, they are transferred to the outside of the interference area $A_I$. If one of the neighboring pickup devices is currently used for reproduction (step S5:YES), another pickup device is selected because the one selected in step S2 is not appropriate (step S7). If both of the neighboring pickup devices are located outside of the interference area $A_I$ (step S4:NO), the selected pickup device does not interfere with any neighboring pickup devices when transferred to the innermost area of the disc, and hence the pickup device is transferred to the innermost circumferential area of the disc (step S8). Then, the pickup device is moved to the playback start position (step S9), and the distributer 18 is controlled to select the reproduction signal of the selected pickup device (step S10) to start the playback (step S11). Then, the system controller 16 waits for the arrival of the next playback start time (step S1:NO).

Figure 7A:
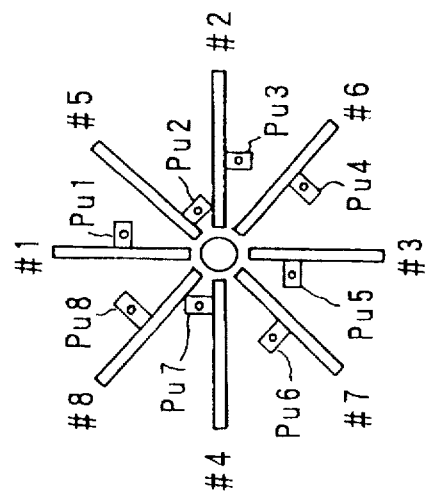
FIGS. 7A–7C are diagrams schematically showing the movement of the pickup devices according to the first embodiment.
Figure 7B:
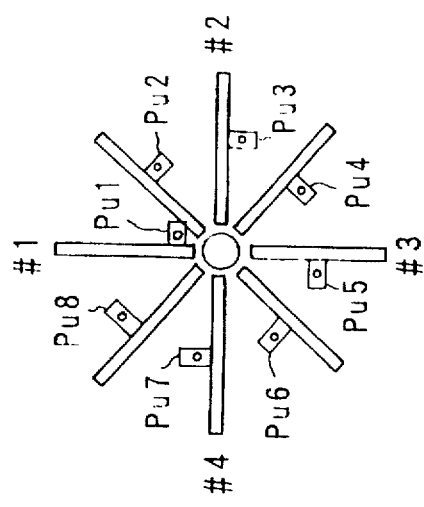
Figure 7C:
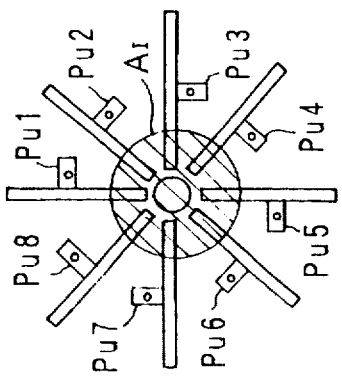

The movement of the pickup devices according to the above described operation is illustrated in FIGS. 7A–7C. FIG. 7A schematically shows the interference area $A_I$ (hatched area). In FIGS. 7B and 7C, the mark "#" indicates the order of the pickup devices used for the playback. If the pickup device PU1 is selected first in step S2, then the pickup device Pu3 whose neighboring pickup devices Pu2 and Pu4 are located outside of the interference area $A_I$ is selected next in step S7. Subsequently, the pickup devices Pu5 and Pu7 are selected and used in this order. When the pickup device Pu7 starts reproduction, the pickup device Pu1 has moved to the outside of the interference area $A_I$. Since the pickup devices Pu1 and Pu3 has already been located outside of the interference area $A_I$ at the subsequent playback start time, the pickup device Pu2 is selected for the next playback. FIG. 7C illustrate this state. In the similar manner, the pickup devices are selected in the order Pu4, Pu6, . . . (i.e., #6, #7), as shown in FIG. 7C.

Figure 6:
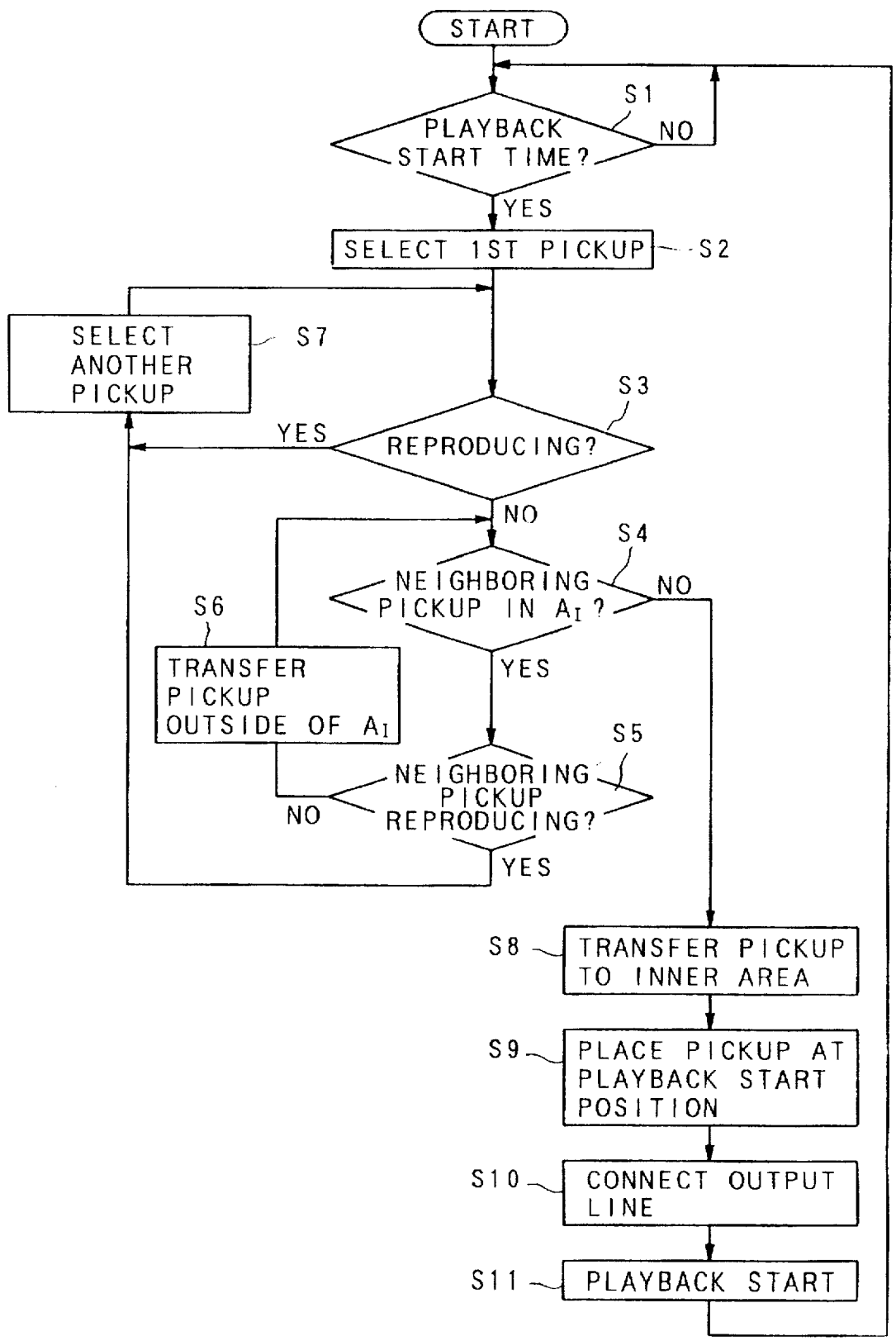
FIG. 6 is a flowchart showing the operation of the disc player according to the first embodiment.

In the above description, an example of pickup movement is explained by referring to FIGS. 7B and 7C. In a case where the interference area $A_I$ is made small by sufficiently downsizing the pickup device, the interference of the pickup devices may be avoided by controlling the movement of the pickup device in such a manner that at least two pickup devices neighboring to each other do not successively start reproduction. It is noted that since the control manner of the flowchart shown in FIG. 6 is designed under the condition that the size of the pickup device is large and the interference area is broad, it may be applied to the freely-designed pickup devices of any size. As described above, the first embodiment proposes the mechanical structure and positioning control of the pickup devices capable of avoiding the physical interference even when the plural pickup devices are equipped. Further, since the control of the pickup selection shown in FIG. 6 eliminates the interference between the neighboring pickup devices, eight pickup devices may be employed, thereby halving the waiting time of the user who requests the program. Still further, even when the pickup devices of relatively large size are employed, the interference of them may be avoided by the pickup movement control described above.

2nd Embodiment

Next, the second embodiment of the present invention will be described. In this embodiment, the reproduction of the program is handed over to other pickup devices one after another. FIG. 8 is a plan view illustrating the arrangement of the pickup devices in the disc player 101 according to the second embodiment. It is noted that the structure of the disc player 101 is basically the same as that of the first embodiment shown in FIGS. 2A and 2B, except for the arrangement of the guide bars. As shown, the disc player 101 includes the long guide bars $G_{1b}$, $G_{3b}$, $G_{5b}$ and $G_{7b}$ capable of successively reproducing information on the disc from the innermost circumference to the outermost circumference, main pickup devices Pu1M, Pu2M, Pu3M and Pu4M for moving along the long guide bars $G_{1b}$, $G_{3b}$, $G_{5b}$ and $G_{7b}$, the short guide bars $G_{2b}$, $G_{4b}$, $G_{6b}$ and $G_{8b}$ capable of reproducing information from a given position of the radial direction of the disc to the outermost circumference of the disc, and the sub-pickup devices Pu1S, Pu2S, Pu3S and Pu4S for moving along the short guide bars $G_{2b}$, $G_{4b}$, $G_{6b}$ and $G_{8b}$. The main pickup devices function to reproduce at least the inner circumferential area of the disc while the sub-pickup device function to reproduce the outer circumferential area of the disc. It is noted that the main pickup device may reproduce to the outermost circumferential area of the disc, if the occasion demands.

Figure 9:
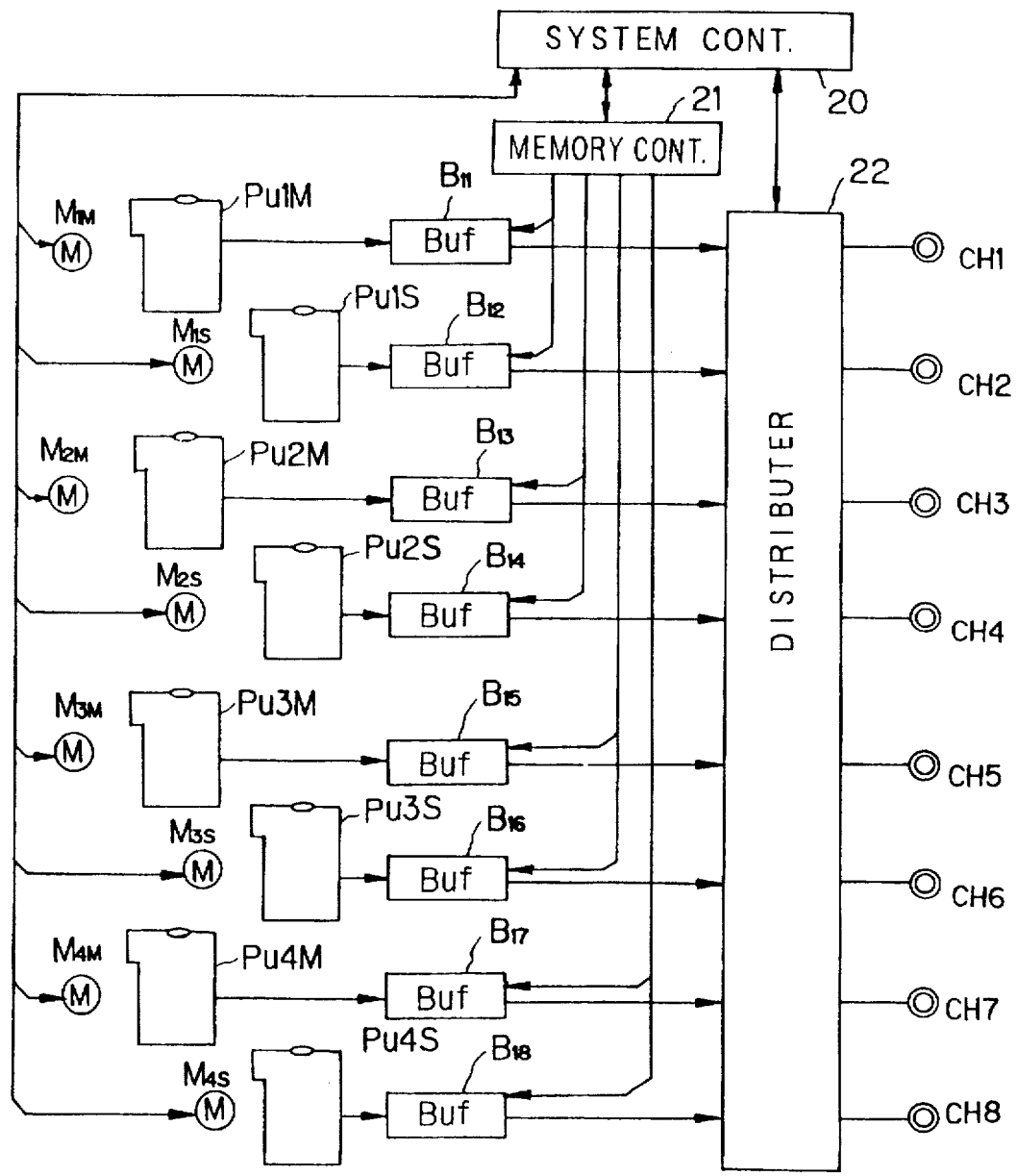
FIG. 9 is a block diagram illustrating the control system of the disc player according to the second embodiment.

FIG. 9 illustrates the construction of the control system of the disc player 101, which includes the buffers $B_{11}$–$B_{18}$, the system controller 20, the memory controller 21, the distributer 22 and the motors $M_{1M}$–$M_{4M}$ and $M_{1S}$–$M_{4S}$. The buffers $B_{11}$, $B_{13}$, $B_{15}$ and $B_{17}$ store the reproduction signals from the main pickup devices Pu1M, Pu2M, Pu2M and Pu4M, and the buffers $B_{12}$, $B_{14}$, $B_{16}$ and $B_{18}$ store the reproduction signals from the sub-pickup devices Pu1S, Pu2S, Pu2S and Pu4S. The system controller 20 controls the memory controller 21 and the distributer 22, and the memory controller 21 controls the read and write timing of the buffers. The motors $M_{1M}$–$M_{4M}$ and $M_{1S}$–$M_{4S}$ drive the main pickup devices and the sub-pickup devices under the control of the system controller 20.

Figure 10:
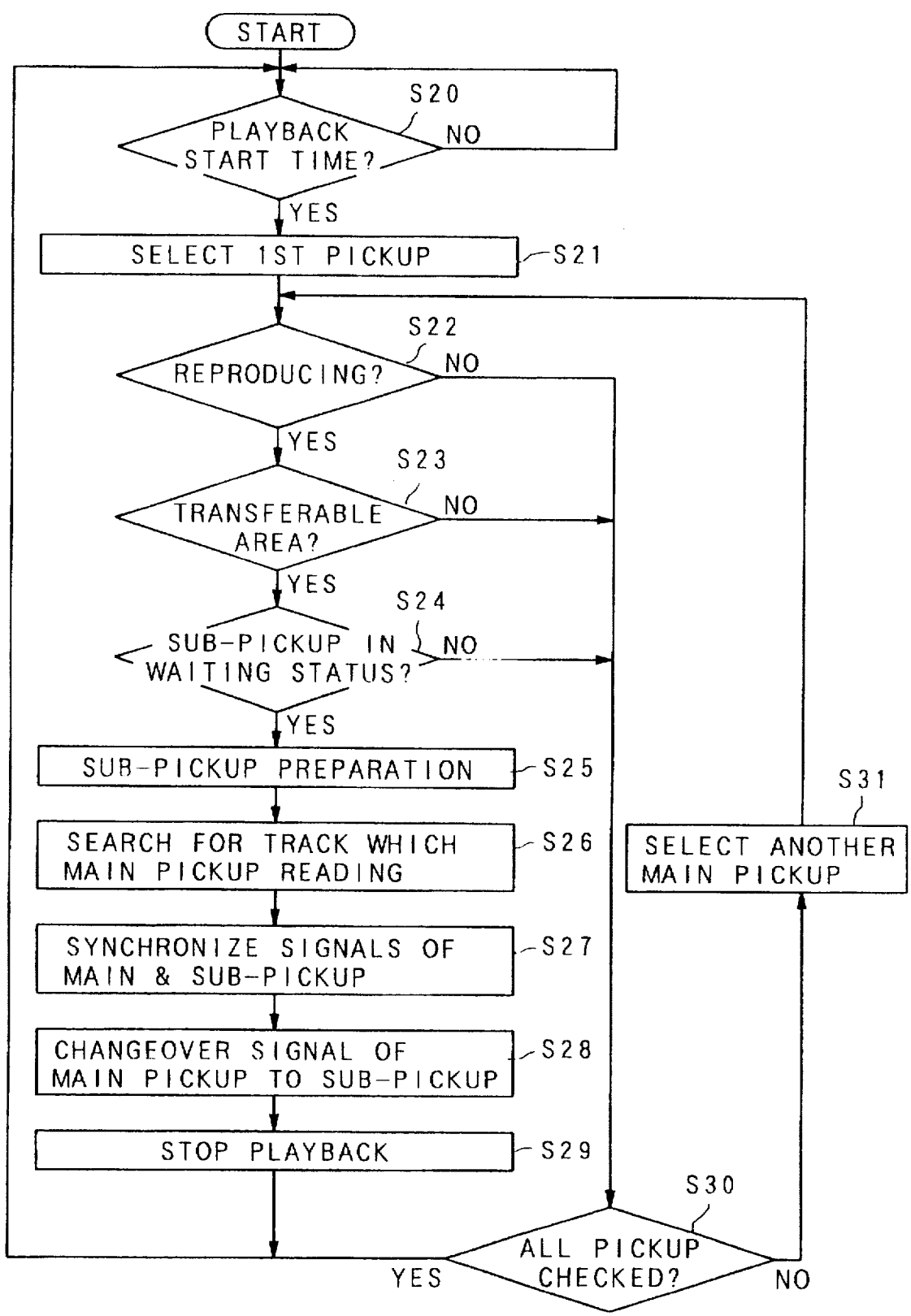
FIG. 10 is a flowchart showing the operation of the disc player according to the second embodiment.

Next, the operation of the disc player 101 according to this embodiment will be described with reference to FIGS. 10, 11A and 11B. The operation described below is performed by or under the control of the system controller 20. As seen from FIG. 8, one sub-pickup device is prepared and provided for each of the main pickup devices. In operation, the main pickup devices reproduce the program from the disc independently of each other with given time lags therebetween, and the reproductions are handed over to the corresponding sub-pickup devices when the main pickup devices enter the area where the sub-pickup can reproduce the disc. FIGS. 11A and 11B illustrate the order of operating the pickup devices. In FIGS. 11A and 11B, the mark "#" indicates the order of the pickup devices used for the playback, and the playback by the pickup device "#n" is handed over to the pickup device "¥n". In step S20, the system controller 20 waits for the playback start time (e.g., every 15 minutes) which is prescribed by the total playback time of the program recorded on the disc and the number of the pickup devices employed. When the playback start time arrives (step S20:YES), the first pickup device, e.g., Pu1M, is selected (step S21). Here, it is assumed that all of the main pickup devices are in reproduction and no one of them is in the waiting status. Then, it is checked whether the selected pickup device is in reproduction or not (step S22). If the pickup device is in reproduction (step S22:YES), then it is checked whether the pickup device has entered the transferable area (step S23). The transferable area is an area where both of the main pickup device and the sub-pickup device on the different guide bar can reproduce the identical track. Since the sub-pickup devices are provided on the short guide bars, the transferable area is an outer circumferential area of the disc where the sub-pickup device can reproduce read the disc. If the pickup device has not entered the transferable area (step S23:N0), the operation goes to step S30. If the pickup has entered the transferable area (step S23:YES), it is checked whether the corresponding sub-pickup device is in the waiting status or reproducing the previous program (step S24). Since the transferable area is prescribed by the length of the short guide bar and is relatively large in this embodiment, the system controller 20 can delay the transfer timing of the reproduction from the main pickup device to the sub-pickup device to a certain extent. If the sub-pickup device is in the waiting status (step S24:YES), the playback by the sub-pickup is prepared (step S25), and then the sub-pickup device searches for the track which the main pickup device is currently reading (step S26). Then, the memory controller 21 makes the reproduction signal of the sub-pickup device synchronized with that of the main pickup device by controlling the buffers $B_{11}$–$B_{18}$ (step S27). Since the memory controller 21 constantly monitors the reproduction signal, it can obtain the complete synchronization of the reproduction signals from the main pickup device and the sub-pickup device. Although it is described that the sub-pickup device searches for the track which the main track is reading in step S26, it is sometimes difficult for the sub-pickup device to trace exactly the same track as the main pickup device. In such a case, the sub-pickup device may controlled to trace the track near the track that the main pickup device is reading, so that the memory controller 21 can make the synchronization of the reproduction signal from the two pickup devices using the buffers $B_{11}$–$B_{18}$. Subsequently, the system controller 20 allows the distributer 22 to supply the reproduction signal of the sub-pickup device to the channel which has been outputting the reproduction signal of the main pickup device up to that time (step S28). Then, the main pickup device terminates the reproduction (step S29), and moves to the playback start point to prepare for the subsequent reproduction. It is noted that this operation may be performed immediately before the subsequent reproduction. On the other hand, if the main pickup device is not in reproduction (step S22:N0), or if the main pickup device has not entered the transfer area (step S23:N0) or if the sub-pickup device is still in reproduction (step S24:N0), it is checked in step S30 whether all main pickup devices has been checked or not. If all main pickup devices have been checked (step S30:YES), the system controller 20 waits for the ending of the reproduction of one of the main pickup devices (steps S20–S29). On the contrary, if any one of the main pickup device has not been checked (step S30:NO), then the system controller 20 selects another main pickup device and check it (step S31).

FIGS. 11A and 11B illustrate the movement of the pickup devices according to the above described operation. FIG. 11A shows the stage where the fourth main pickup device Pu4M starts the reproduction. The main pickup device Pu1M has entered the transfer area, and the main pickup device Pu1M is going to hand over the playback to the corresponding sub-pickup device Pu1S. FIG. 11B illustrates the stage immediately after the transfer of the playback from the pickup device Pu1M to the pickup device Pu1S. If the total playback time of the program is relatively short and hence less than four playback start times are needed, only the main pickup devices may be used without transferring the playback from the main pickup device to the sub-pickup device.

As described above, according to the second embodiment, the program can be reproduced at eight different times using only four pickup devices having the ability to read the innermost circumferential area of the disc. Since only four guide bars are needed to be provided at the inner circumferential portion, the efficiency of the playback may be doubled even in use of the relatively large-sized pickup devices.

3rd Embodiment

Next, the third embodiment of the present invention will be described. In this embodiment, a plurality of pickup devices are provided on a single guide bar, and the playback of the program is handed over from one to another.

Figure 12:
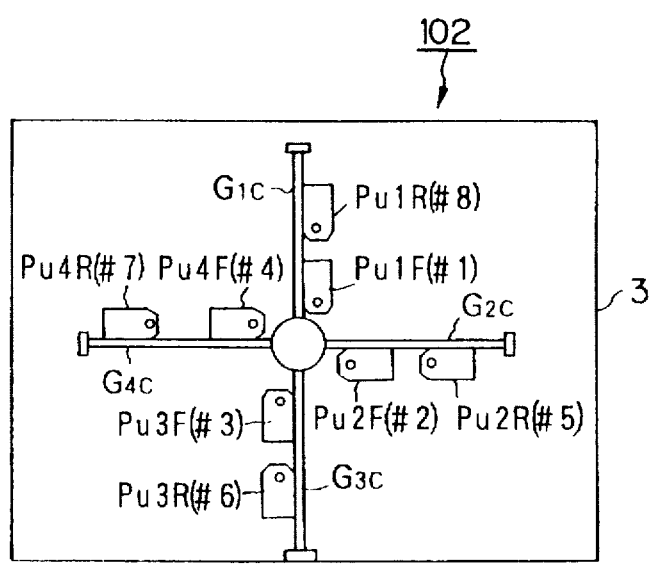
FIG. 12 is a plan view illustrating the structure of the disc player according to the third embodiment.

FIG. 12 illustrates the arrangement of the pickup devices in the disc player 102 according to this embodiment. It is noted that the structure of the disc player 102 is basically the same as that of the first embodiment shown in FIGS. 2A and 2B, except for the arrangement of the plural pickup devices. As shown, the disc player 102 includes the guide bars $G_{1c}$–$G_{4c}$ disposed on the base 3 for successively reproducing information from the innermost circumference to the outermost circumference of the disc. The guide bar $G_{1c}$ is equipped with the front pickup device Pu1F and the rear pickup device Pu1R, the guide bar $G_{2c}$ is equipped with the front pickup device Pu2F and the rear pickup device Pu2R, the guide bar $G_{3c}$ is equipped with the front pickup device Pu3F and the rear pickup device Pu3R and the guide bar $G_{4c}$ is equipped with the front pickup device Pu4F and the rear pickup device Pu4R. It is noted that more pickup devices may be equipped on the single guide bar so that the number of the guide bar and the area occupied by the pickup devices may be reduced. For example, if four pickup devices are disposed on the single guide bar, the program may be reproduced at eight different times using two guide bars. The control system of the third embodiment is fundamentally identical to that of the second embodiment shown in FIG. 9, on the assumption that the front pickup devices Pu1F–Pu4F correspond to the main pickup devices Pu1M–Pu4M and the rear pickup devices Pu1R–Pu4R correspond to the sub-pickup devices Pu1R–Pu4R.

Figure 13:
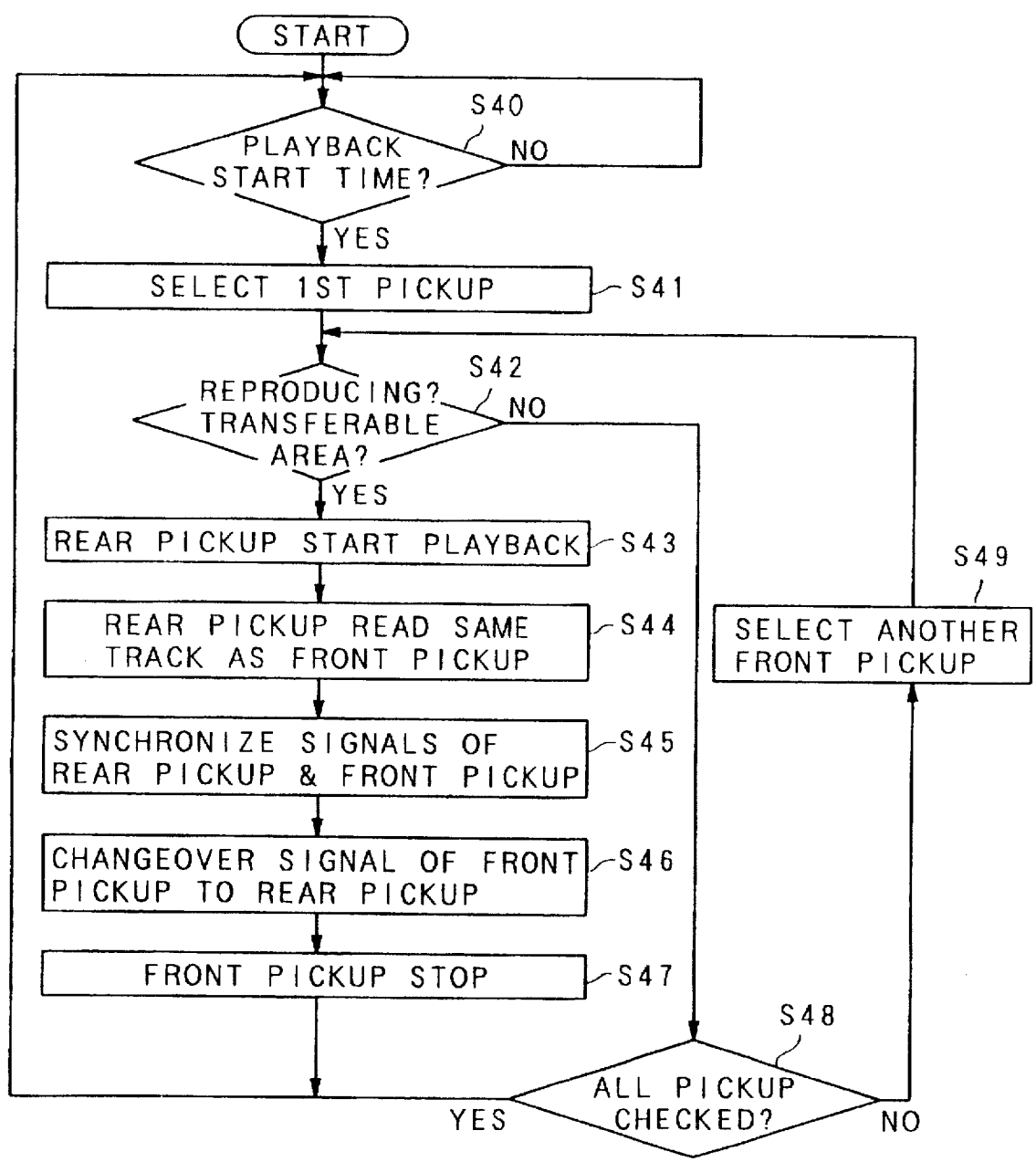
FIG. 13 is a flowchart showing the operation of the disc player according to the third embodiment.
Figure 14A:
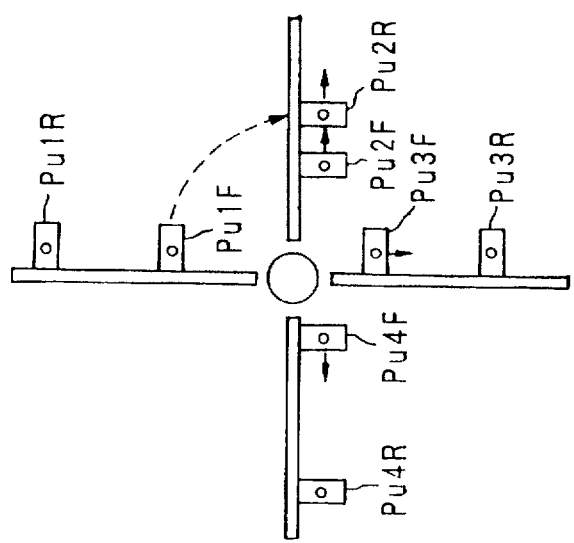
FIGS. 14A and 14B are diagrams schematically showing the movement of the pickup devices according to the third embodiment.

Next, the operation of the disc player 102 according to this embodiment will be described with reference to FIGS. 13, 14A and 14B. The operation described below is performed by or under the control of the system controller 20. In this embodiment, the pickup devices start playback in the order indicated by the mark "#" shown in FIG. 12. When the playback start time arrives (step S40:YES), the first pickup device, e.g., Pu1F, is selected (step S41). Then it is checked whether or not the selected pickup device is reproducing information out of the transferable area (step S42). The transferable area is an area where both of the front pickup device and the rear device on the different guide bar can reproduce the identical track. If the pickup device is reproducing information out of the transfer area (step S42:N0), it is checked whether all front pickup devices have been checked (step S48). If NO, the next pickup device is selected (step S49). On the contrary, if there is no front pickup devices remained non-checked (step S48:YES), then the system controller 20 waits for the pickup device which becomes the waiting state before the next playback start time (step S40). FIG. 14A illustrates the stage where the four front pickup devices Pu1F–Pu4F are reproducing information. If the pickup selected in step S41 (Pu1F, in this case) is reproducing information within the transfer area (step S42:YES), the rear pickup device (Pu2R, in this case) starts reproduction (step S43). The rear pickup device to which the reproduction is handed over starts reproduction of the same track as the front pickup is currently reproducing (step S44). Then, the system controller 20 controls the memory controller 21 so that the reproduction signal of the rear pickup device is synchronized with that of the front pickup device (step S45). Subsequently, the system controller 20 permits the distributer 22 to switch the reproduction signal of the front pickup device to that of the rear pickup device (step S46), and stops the reproduction by the front pickup device (step S47).

Figure 14B:
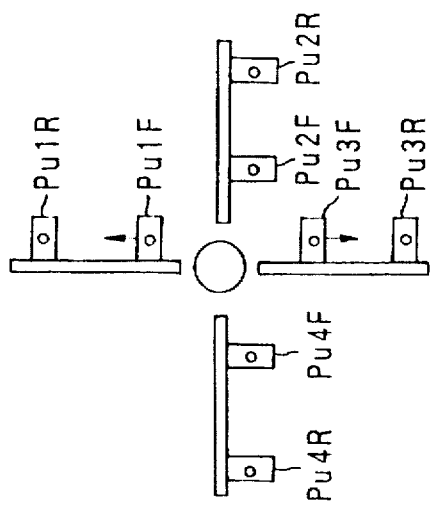
Figure 15:
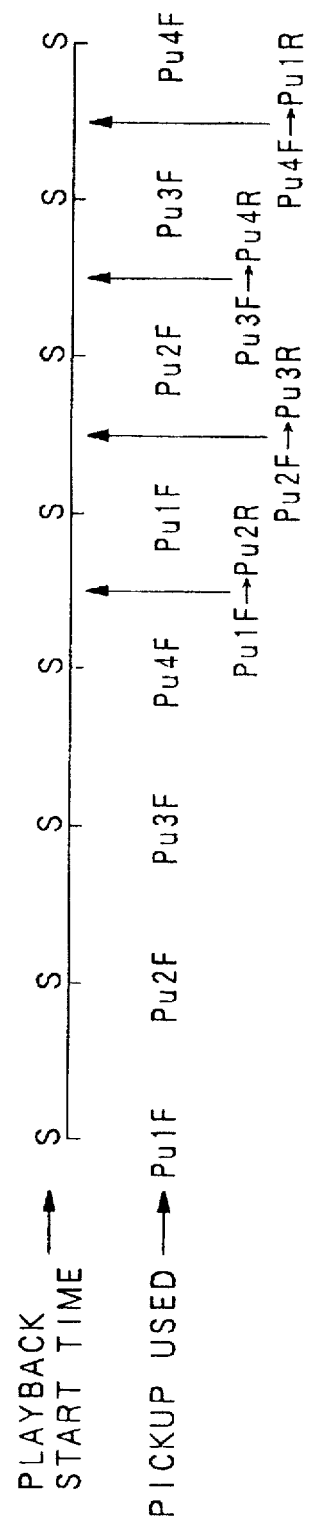
FIG. 15 is a time-chart illustrating manner of transferring the playback between the pickup devices.

FIG. 14B illustrates the stage where the playback by the front pickup device is handed over to the rear pickup device. The reproduction by the front pickup is handed over to the rear pickup device disposed on the guide bar different from the one supporting the front pickup device. This is because the two pickup devices on the same guide bar cannot read the same track simultaneously. While the transfer of the reproduction occurs once between two pickup devices in the above description, it may be increased if more pickup devices are provided on the single guide bar. FIG. 15 illustrates the manner of playback according to the passage of time. As shown, the pickup devices start playback of the disc in the order Pu1F, Pu2F, Pu3F and then Pu4F. After the start of the playback by the front pickup device Pu4F and before the start of the playback by the pickup device Pu2R, the playback is transferred from the pickup device Pu1F to Pu2R. Then, the pickup device Pu1F is transferred to the innermost circumferential area of the disc and waits for the next playback start time. Thereafter, the playback is transferred from Pu2F to Pu3R, from Pu3F to Pu4R, and from Pu4F to Pu1R, in the similar manner.

Where two guide bars are employed and four pickup devices are disposed on each of the guide bars, the playback transfer should occur for three times. Specifically, the operation is performed as follows. The first pickup device on the first guide bar starts playback, and then it is handed over to the first pickup device on the second guide bar. Similarly, the playback by the first pickup device on the second guide bar is handed over to the second pickup on the first guide bar. In the same manner, the playback is transferred in the following manner:

(2nd pickup of 1st guide bar)→(2nd pickup of 2nd guide bar)→(3rd pickup of 1st guide bar)→(3rd pickup of 2nd guide bar)→(4th pickup of 1st guide bar)→(4th pickup of 2nd guide bar).

In this way, the playback is transferred. Since the pickup device which has handed over the playback becomes free, it can start next playback. Therefore, eight pickup devices can continue the playback in parallel. The number of the pickup devices to be employed on the single guide bar is dependent upon the width of the pickup device itself in the radial direction of the disc and the necessary margin between the pickup devices positioned on the guide bar.

As described above, according to the third embodiment, playback of the program is transferred from one pickup device to another. Therefore, many pickup devices can simultaneously reproduce information with less occupation of the space for the pickup devices, thereby reducing the waiting time of the user. Indeed, since less guide bars are employed in this embodiment, the interference between the pickup devices or guide bars may be avoided even in use of the relatively large-sized pickup devices.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A disc player comprising:

a plurality of guide means arranged radiately in radial directions of a disc from a rotary axis of the disc, each of said guide means comprising two parallel shafts substantially vertically arranged with respect to the surface of the disc for supporting at least one pickup device in a manner slidable in the radial direction, vertical positions of the parallel shafts of one of said guide means being different from the vertical positions of the parallel shafts of the guide means neighboring to said one guide means so that the parallel shafts are substantially vertically aligned at inner end portion of said shafts on the side of the rotary axis.

2. A disc player according to claim 1, further comprising a base, said guide means being provided on said base.

3. A method of reproducing a program recorded on a disc for a plurality of times using a plurality of pickup devices, said method comprising the steps of:

(a) selecting one of said pickup devices;

(b) detecting whether two pickup devices neighboring to the pickup device selected in step (a) are located inside of a circular area having a predetermined radius from a rotary axis of the disc;

(c) checking whether said neighboring pickup devices are reading the disc or not;

(d) if both of the neighboring pickup devices are located outside of the circular area, then transferring said selected pickup device to a playback start position of the program at an inner circumferential area of the disc and starting a playback of the program;

(e) if both of the neighboring pickup devices are located in the circular area and are not reading the disc, then transferring the neighboring pickup devices to outside of the circular area and transferring said selected pickup device to the playback start position to start the playback of the program; and (f) if at least one of the neighboring pickup devices are located in the circular area and are reading the disc, then selecting another pickup device and repeating the steps (b) to (f).

4. A disc player comprising:

a plurality of pickup devices;

a plurality of transfer means arranged radiately in radial directions of a disc from a rotary axis of the disc for transferring said pickup devices in the radial directions;

a plurality of position detection means for detecting the position of said pickup device in the radial direction and for outputting a first detection signal when said pickup device is transferred to an inside a circular area having a predetermined radius from a rotary axis of the disc;

check means for checking whether said pickup devices are reading the disc or not, and for outputting a second detection signal when each of the pickup devices are reading the disc; and control means for receiving the first detection signals and second detection signals, for allowing said transfer means to transfer the pickup devices neighboring to one pickup device to an outer area of the circular area, before starting a playback using said one pickup device, if the both of the neighboring pickup devices are located in the circular area and are not reading the disc, and for inhibiting the playback using said one pickup device if at least one the neighboring pickup devices are located in the circular area and are reading the disc.

5. A method of reproducing a program recorded on a disc for a plurality of times with time intervals using a plurality of pickup devices, said method comprising the steps of:

(a) determining the time interval based on a playback time of a program recorded on said disc;

(b) transferring all of said pickup devices to an outside of a circular area having a predetermined radius from a rotary axis of the disc;

(c) selecting one of said pickup devices and starting playback of the program using the selected pickup device;

(d) selecting another one of the pickup devices other than two pickup devices neighboring to said one pickup device selected in the step (c) and starting playback of the program using the pickup device newly selected with a delay of the time interval from the playback in step (c);

(e) selecting one of the pickup devices other than two pickup devices neighboring to said one pickup device selected in the step (d) and starting playback of the program using the pickup device newly selected with a delay of the time interval from a start of the playback in step (d); and (f) repeating the step (e).

6. A method of reproducing a program recorded on a disc for a plurality of times with time intervals using a plurality of pickup devices arranged radiately from a rotary axis of the disc in a manner movable in radial directions the disc, said method comprising the steps of:

(a) determining the time interval based on a playback time of a program recorded on said disc;

(b) transferring all of said pickup device to an outside of a circular area having a predetermined radius from the rotary axis; and (c) determining an order of the pickup devices used for playback, said determining step (c) comprising the steps of:

(d) numbering all of the pickup devices in one of clockwise and counterclockwise direction;

(e) selecting the odd-numbered pickup devices and starting playback using the odd-numbered pickup devices in an order from the one having a smallest number to the one having a largest number; and (f) selecting the even-numbered pickup devices and starting playback using the even-numbered pickup devices in an order from the one having a smallest number to the one having a largest number.

7. A method of reproducing a program from a disc using a disc player comprising a plurality of pickup devices arranged radiately from a rotary axis of the disc in a manner movable in radial directions the disc, said pickup devices comprising at least one pair of an inside pickup device for reading at least an inside of a circular area having a predetermined radius from the rotary axis and an outside pickup device for reading an outside of the circular area, said method comprising the steps of:

(a) starting a reproduction by said outside pickup device when said inside pickup device has read the disc up to an outer circumference of the circular area;

(b) synchronizing a reproduction signal of said outside pickup device with a reproduction signal of said inside pickup device; and (c) changing an output signal of the disc player from the reproduction signal of the inside pickup device to the reproduction signal of the outside pickup device.

8. A disc player comprising:

a plurality of pickup devices arranged radiately from a rotary axis of a disc in a manner movable in radial directions of the disc, said pickup devices comprising at least one pair of an inside pickup device for reading at least an inside of a circular area having a predetermined radius from the rotary axis and an outside pickup device for reading an outside of the circular area;

transfer means for transferring said pickup devices in the radial directions independently of each other;

detection means for outputting a detection signal when said inside pickup device reproduces the disc up to an outer circumference of the circular area;

control means for permitting said outside pickup device to start reproduction in response to the detection signal;

synchronization means for synchronizing a reproduction signal of said outside pickup device with a reproduction signal of said inside pickup device; and output selection means for changing an output signal of the disc player from the reproduction signal of the inside pickup device to the reproduction signal of the outside pickup device after the reproduction signals are synchronized by said synchronization means.

9. A disc player according to claim 8, wherein said transfer means comprises a short guide mechanism extending outwardly from the outer circumferential edge of the circular area for guiding said outside pickup device, and a long guide mechanism extending from an innermost circumference of the disc to the outer circumference of the disc for guiding said inside pickup device.

10. A disc player according to claim 9, wherein innermost ones of said plurality of pickup devices provided on said plurality of transfer means start reproduction of the program at different times, respectively.

11. A method of reproducing a program from a disc using a disc player comprising a plurality of pickup devices arranged in a manner slidable in the radial direction of the disc, said method comprising the steps of:

(a) determining a group of the pickup devices for reproducing a program in combination;

(b) determining a reproduction start position and a reproduction end position for each of the pickup devices belonging to the group;

(c) starting reproduction of the program using one pickup devices provided at an innermost circumferential position;

(d) starting reproduction of the program using another one of the pickup devices provided immediately outside of said one pickup device;

(e) synchronizing reproduction signals of said one pickup device and said another pickup device; and (f) changing an output signal from the reproduction signal of said one pickup device to the reproduction signal of said another pickup device.

12. A disc player comprising:

a plurality of pickup devices;

a plurality of transfer means arranged radiately from a rotary axis of a disc for transferring a plurality of pickup devices independently of each other in radial directions of the disc;

control means for determining one of the pickup devices to which a reproduction of another pickup device is to be handed over and for starting reproduction by said one pickup device;

synchronization means for synchronizing a reproduction signal of said one pickup devices with a reproduction signal of said another one pickup device; and change means for changing an output signal of said disc player from the reproduction signal of said another pickup device to the reproduction signal of said one pickup device.

* * * * *